(12) United States Patent
Johannsen et al.

(10) Patent No.: US 7,254,248 B2
(45) Date of Patent: Aug. 7, 2007

(54) ONE-MAGNET RECTANGULAR TRANSDUCER

(75) Inventors: Leif Johannsen, Odder (DK); Morten Kjeldsen Andersen, Odder (DK); Finn Jensen, Hinnerup (DK)

(73) Assignee: Sonion Horsens A/S, Horsens (DK)

( * ) Notice: Subject to any disclaimer, the term of this patent is extended or adjusted under 35 U.S.C. 154(b) by 420 days.

(21) Appl. No.: 10/621,375

(22) Filed: Jul. 18, 2003

(65) Prior Publication Data
US 2004/0086149 A1 May 6, 2004

(51) Int. Cl.
H04R 1/00 (2006.01)
H04R 1/02 (2006.01)
H04R 9/06 (2006.01)
H04R 11/02 (2006.01)

(52) U.S. Cl. ............ 381/409; 381/412; 381/420; 381/431

(58) Field of Classification Search ............ 381/186, 381/396, 398–399, 401, 408–409, 412, 417, 381/420, 423, 426, 431
See application file for complete search history.

(56) References Cited

U.S. PATENT DOCUMENTS

| | | | | |
|---|---|---|---|---|
| 3,651,283 A | * | 3/1972 | Doschek | 381/419 |
| 4,264,789 A | * | 4/1981 | Kaizu et al. | 381/408 |
| 4,319,096 A | * | 3/1982 | Winey | 381/431 |
| 4,330,691 A | * | 5/1982 | Gordon | 381/335 |
| 4,472,605 A | * | 9/1984 | Klein | 381/186 |
| 4,544,805 A | * | 10/1985 | Sawafuji | 381/410 |
| 5,430,805 A | * | 7/1995 | Stevenson et al. | 381/408 |
| 5,627,903 A | * | 5/1997 | Porrazzo et al. | 381/423 |
| 5,953,438 A | * | 9/1999 | Stevenson et al. | 381/431 |
| 6,137,891 A | * | 10/2000 | Porrazzo et al. | 381/408 |
| 6,324,907 B1 | * | 12/2001 | Halteren et al. | 73/431 |
| 6,931,140 B2 | * | 8/2005 | Van Halteren et al. | 381/182 |
| 6,956,953 B2 | * | 10/2005 | Mazarakis | 381/152 |
| 2002/0114214 A1 | * | 8/2002 | Hansen et al. | 367/6 |
| 2003/0048920 A1 | * | 3/2003 | Van Halteren et al. | 381/424 |
| 2003/0174856 A1 | * | 9/2003 | Johannsen et al. | 381/401 |
| 2004/0087346 A1 | * | 5/2004 | Johannsen et al. | 455/566 |
| 2005/0031152 A1 | * | 2/2005 | Hansen et al. | 381/410 |
| 2005/0111688 A1 | * | 5/2005 | Wilmink et al. | 381/396 |
| 2006/0050906 A1 | * | 3/2006 | Van Halteren et al. | 381/182 |

FOREIGN PATENT DOCUMENTS

| | | |
|---|---|---|
| EP | 0 296 139 | 12/1998 |
| EP | 1 194 001 | 4/2002 |
| WO | WO 02/03748 | 1/2002 |

* cited by examiner

*Primary Examiner*—Curtis Kuntz
*Assistant Examiner*—P. Dabney
(74) *Attorney, Agent, or Firm*—Harness, Dickey & Pierce

(57) ABSTRACT

An electroacoustic transducer comprising a magnetic circuit of a magnetically conductive material with a pair of opposed surfaces defining a gap there between, the magnetic circuit comprising one magnet. The magnet can either be positioned in the center of the magnetically conductive material so as to form two gaps. In an alternative embodiment the magnet is attached to the magnetically conductive material forming only one gap. The transducer further comprises a diaphragm and a coil system having electrically conducting paths fastened to the diaphragm. The coil system has portions of its paths situated in the gap. The transducer may be supplied with an additional diaphragm and coil system positioned on the opposite side of the magnetic circuit. In a preferred embodiment the transducer is rectangular. The transducer is suited for integration into miniature components such as mobile communication equipment and hearing aids. Embodiments of the transducer are suited for side-firing or side-shooting applications such as in mobile phones.

10 Claims, 15 Drawing Sheets

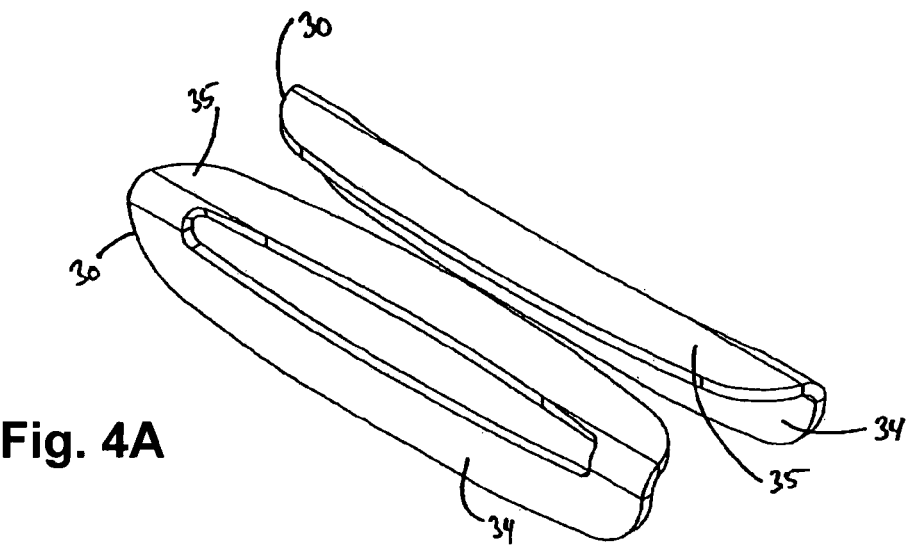
Fig. 4A
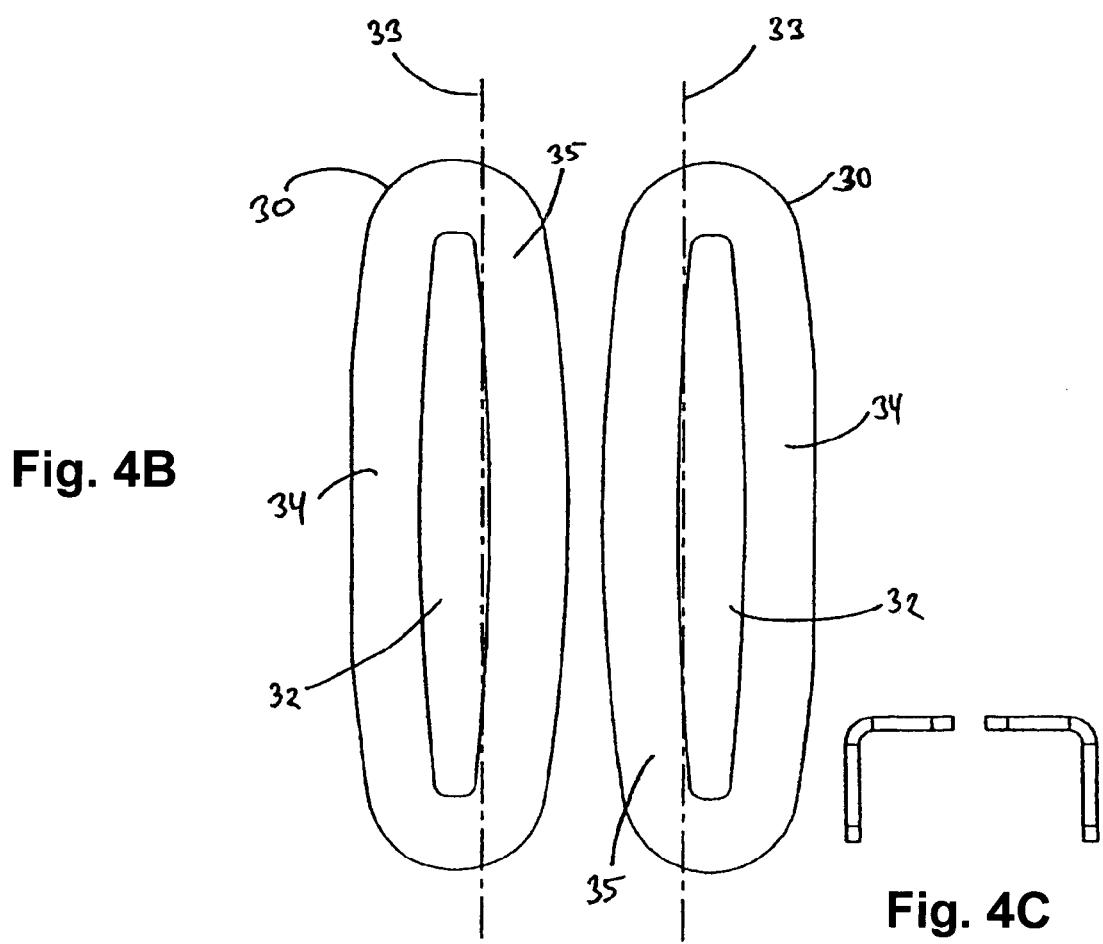
Fig. 4B
Fig. 4C

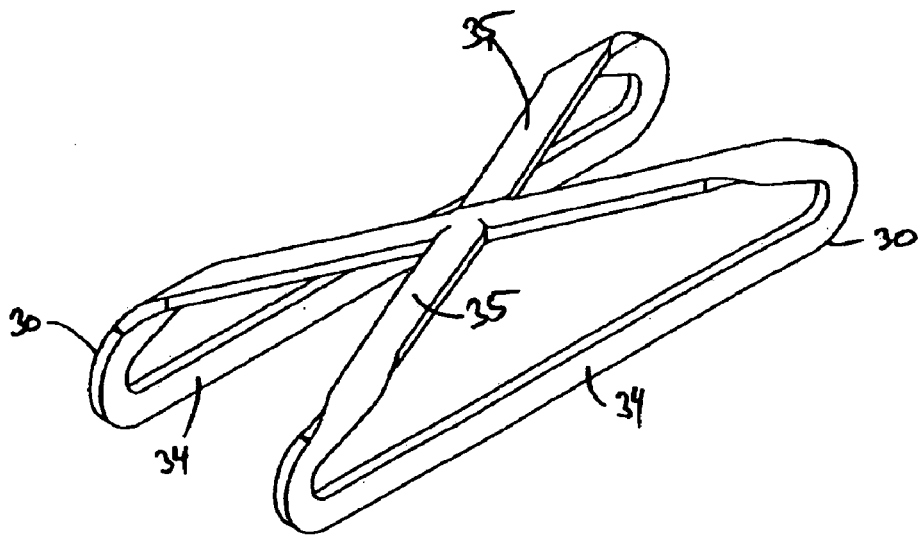
Fig. 5A
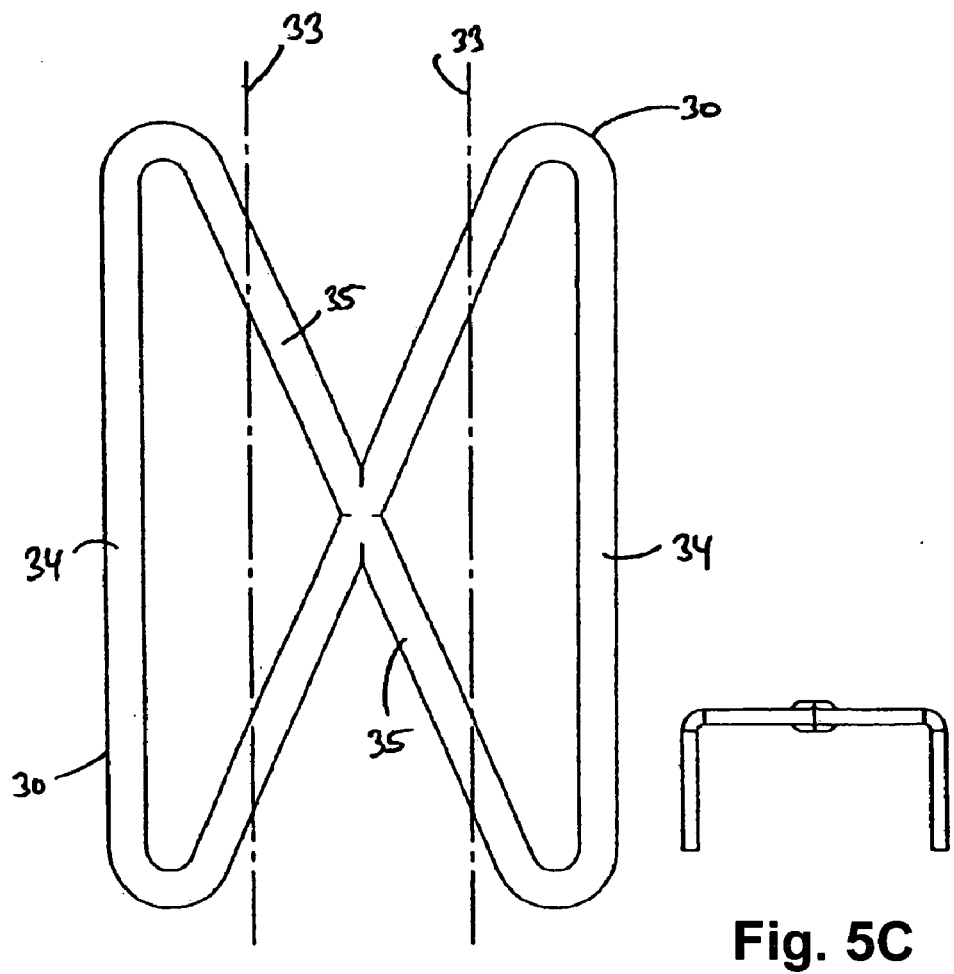
Fig. 5C
Fig. 5B

ONE-MAGNET RECTANGULAR TRANSDUCER

FIELD OF THE INVENTION

The present invention relates to electroacoustic transducers, in particular to electroacoustic transducers with magnetic circuits having through-going openings carrying permanent magnets so as to generate magnetic field in one or two gaps within the openings of the magnetic circuit.

BACKGROUND OF THE INVENTION

Electroacoustic transducers, and in particular electrodynamic transducers, are widely used in telecommunications equipment such as wired and mobile telephones, where small size is a requirement. Traditional electrodynamic microphones and loudspeaker transducers used in e.g. mobile telephones are rotational symmetric and have a circular disc or ring-shaped permanent magnet, which is magnetised in the axial direction of the magnet. A magnetic circuit of magnetically soft iron or other suitable material define a ring-shaped gap with a radially oriented magnetic field generated by the magnet. A diaphragm carries a ring-shaped coil of electrically conducting wire situated in the gap.

If the inner and outer members defining the gap are not perfectly coaxial, the gap will not have a uniform width resulting in a distorted distribution of the magnetic field along the gap. A coil carrying electric currents at audio frequencies in such a distorted magnetic field will tend not to move in a linear movement but rather to tilt, which causes linear and nonlinear distortion.

In such transducers the magnetic field in the ring-shaped gap is radially oriented, whereby the magnetic field is inherently stronger at its inner limit than at its outer limit. A not perfectly centred coil will cause the same distortion as mentioned above.

Another disadvantage of traditional transducers with ring-shaped magnetic gap is related to the fact that they require a considerable building height since the magnetic circuit requires a bottom piece. For applications in miniature equipment, such as hearing aids or mobile phones, the dimensions of each component is a crucial parameter whereby the use of traditional transducers with ring-shaped gaps within e.g. hearing aids becomes a very difficult task.

It is an object of the present invention to solve the above-mentioned problems/disadvantage of traditional transducers that related to the fact that they are not suitable for miniature applications—such as being used in hearing aids or mobile phones.

It is another object of the present invention to solve the above-mentioned disadvantage of traditional transducers that relates to the fact that small imperfections in the magnetic field causes distortion of the acoustic output (or electrical output in case of the transducers used as microphones).

SUMMARY OF THE INVENTION

The above-mentioned objects are complied with by providing, in a first aspect, an electroacoustic transducer comprising
 a magnetic circuit having a first and a second gap, each of the first and second gaps having an upper and a lower portion, the magnetic circuit further comprising magnetic means so to establish a magnetic field in each of the first and second gaps,
 an upper diaphragm, and
 an upper coil system comprising at least one coil forming an electrically conducting path, the upper coil system having portions of the electrically conducting path fastened to the upper diaphragm, the upper coil system further having first and second gap portions of its electrically conducting path situated in respective ones of the upper portions of the first and second gaps, wherein the magnetic means comprises a magnet arranged so that each of its magnetic poles defines a surface of respective ones of the first and second gaps.

The fact that each of the magnetic poles of the magnet forms a surface of each of the two gaps makes it possible to produce the magnetic circuit with very compact dimensions, especially with respect to the height of the transducer. Therefore, the transducer is very well suited for miniature applications such as mobile phones and hearing aids. In addition, the design of the magnetic circuit results in a simple magnetic field in the two gaps with flux lines perpendicular to the gaps. Therefore, the homogeneity of the magnetic field is fundamentally insensitive to small imperfections due to production tolerances. This property makes the design suited for applications requiring high quality transducers with low distortion in combination with low production costs. The latter is supported by the fact that the magnetic circuit of the present invention can be formed by parts which are simple to manufacture. Compared to the height of the transducer the magnetic field is very strong, whereby the transducer can be made even smaller and still have the same sensitivity. Further, due to the magnetic circuit the transducer will have a reduced stray magnetic field relative to the traditional transducers.

In a preferred embodiment the first aspect of the invention comprises a transducer wherein the first and second gap portions of the upper coil system are adapted to conduct electrical current in substantially the same direction.

In this way the magnetic forces of the two coil systems will move the diaphragm in the same direction rather than causing a tilting movement of the diaphragm.

In addition, in an even preferred embodiment, the first aspect of the invention is a transducer wherein a flexible circuit board, such as a flexprint, forms the upper diaphragm, and wherein the upper coil system is formed by electrically conducting paths on the flexible circuit board.

This integrated coil and diaphragm design has the fundamental advantage of excellent mechanical coupling between coil and diaphragm. This has the effect that the diaphragm will follow the coil movements precisely without break-up phenomena, resulting in low distortion. In addition, the integrated coil and diaphragm makes the transducer simpler by reducing the number of parts in the manufacturing process.

The transducer may have a magnetic circuit comprising a body of magnetically conductive material, the body having one opening, the opening having a pair of opposed surfaces, each of the opposed surface defining a surface of respective ones of the first and second gaps. Preferably, the opening in the magnetic circuit is through-going.

These features enable a transducer which is basically very flat since there is no bottom part of the magnetic circuit—a prerequisite in conventional ring-shaped designs.

The transducer may have a magnetic circuit further comprising a pole shoe arranged in a plane substantially parallel to the diaphragm.

This leaves the possibility of reducing some of the dimensions of the magnetic circuit and/or to reduce weight of the magnetic circuit. This may be interesting for applications where the transducer has to be fit into devices with very limited space available in one or two dimensions.

The transducer may also comprise an upper diaphragm having electrically conductive portions, and wherein the upper coil system has electrically conducting path ends electrically connected to the electrically conductive portions of the diaphragm, the electrically conductive portions further having externally accessible portions for electrically terminating the transducer.

These characteristics enable a mechanically robust design of the wiring necessary for interconnection of coils and for external connection of the transducer.

The transducer may further comprise an upper front cover positioned in front of the upper diaphragm so as to protect the diaphragm. The upper front cover may comprise at least one acoustic opening. The at least one acoustic opening in the upper front cover may be positioned at an upper front part of the front cover. This upper front part may be a substantially flat portion of the front cover part being substantially parallel with the plane defined by the diaphragm. However, the front cover may in principle take any shape, and may, thus, have curved sections.

Alternatively, the at least one acoustic opening in the upper front cover may be positioned in a side part of the front cover. The upper front cover may form a substantially airtight interface with the magnetic circuit.

The transducer may further comprise a casing for housing the magnetic circuit, the casing comprising a rectangular-shaped opening being defined by two pairs of edges, the upper diaphragm being attached to the casing in a manner so as to at least partly cover the rectangular-shaped opening. Preferably, the upper diaphragm has a rectangular shape so as to cover the rectangular-shaped opening of the casing. In this embodiment, the upper front cover may be attached to at least part of the casing. Also in this embodiment the upper front cover may comprise at least one acoustic opening which may be positioned at an upper front part of the front cover. Alternatively, the at least one acoustic opening of the upper front cover may be positioned in a side part of the front cover. The upper front cover may form a substantially airtight interface with the two pairs of edges of the casing.

The transducer according to the first aspect of the invention may further comprise
  a lower diaphragm, and
  a lower coil system comprising at least one coil forming an electrically conducting path, the lower coil system having portions of the electrically conducting path fastened to the lower diaphragm, the lower coil system further having first and second gap portions of its electrically conducting path situated in respective ones of the lower portions of the first and second gaps.

This possibility of adding another diaphragm can be utilised for applications requiring higher acoustic output. In addition, the presence of two diaphragms enables a transducer with a more spherical radiation characteristics, and it leaves the possibility to control the directivity to some degree. An additional possibility with two diaphragms is to use the transducer as a vibration source when the diaphragms are electrically connected so as to move in the same direction.

In addition to having an upper front cover, the transducer may further comprise a lower front cover positioned in front of the lower diaphragm. The lower front cover may comprise at least one acoustic opening. The at least one acoustic opening in the lower front cover may be positioned at a lower front part of the front cover or in a side part of the front cover. The lower front cover may form a substantially airtight interface with the magnetic circuit. Alternatively, the lower front cover forms a substantially airtight interface with an associated casing housing the magnetic circuit.

A transducer according to the first aspect of the invention may have a coil system comprising
  a substantially flat fastening portion for fastening the coil system to a diaphragm, and
  at least two gap portions outside the fastening plane, each gap portion comprising a plurality of electrically conducting segments being substantially parallel to the fastening portion.

This coil design enables a rigid connection between the coil and the diaphragm since it provides the possibility of attaching the coil to the diaphragm in its entire length thus resulting in piston-like diaphragm movements, thereby reducing distortion.

A second aspect of the invention relates to an electroacoustic transducer comprising
  a magnetic circuit having a gap having an upper and a lower portion, the magnetic circuit further comprising magnetic means so to establish a magnetic field in the gap,
  an upper diaphragm, and
  an upper coil system comprising at least one coil forming an electrically conducting path, the upper coil system having portions of the electrically conducting path fastened to the upper diaphragm, the upper coil system further having gap portions of its electrically conducting path situated in the upper portion of the gap, wherein the magnetic means comprises a magnet arranged so that one of its magnetic poles defines a surface of the gap.

The second aspect of the invention enables a fundamentally very compact and simple transducer. Therefore, the transducer is also very well suited for miniature applications such as mobile phones and hearing aids. In addition, the design of the magnetic circuit results in a simple magnetic field in the gap with flux lines perpendicular to the gap. Therefore, the design is fundamentally insensitive to small imperfections due to production tolerances. This property makes the design suited for applications requiring high quality transducers with low distortion in combination with low production costs.

The transducer according to the second aspect of the present invention, may further comprise an upper front cover positioned in front of the upper diaphragm and comprising at least one acoustic opening being positioned at an upper front part of the front cover or being positioned in a side part of the upper front cover. The upper front cover may form a substantially airtight interface with the magnetic circuit. The upper front cover may, alternatively, form a substantially airtight interface with the two pairs of edges of a casing housing the magnetic circuit.

In a preferred embodiment, the second aspect of the invention comprises a transducer further comprising
  a lower diaphragm, and
  a lower coil system comprising at least one coil forming an electrically conducting path, the lower coil system having portions of the electrically conducting path fastened to the lower diaphragm, the lower coil system further having gap portions of its electrically conducting path situated in the lower portion of the gap.

A lower front cover may be positioned in front of the lower diaphragm so as to protect the diaphragm. The lower front cover may comprises at least one acoustic opening being positioned at a lower front part of the lower front cover. Alternatively, the at least one acoustic opening in the lower front cover may be positioned in a side part of the lower front cover.

The lower front cover may form a substantially airtight interface with the magnetic circuit.

Alternatively, the lower front cover may be attached to at least part of a casing housing the magnetic circuit. The lower front cover may form a substantially airtight interface with two pairs of edges of the casing.

Generally speaking, the transducer according to both aspects of the invention is equally suitable as a loudspeaker transducer and as a microphone. When used as a loudspeaker, electrical signals at audio frequencies may be supplied to the terminals, and the resulting current in the gap portions of the coil wire will interact with the magnetic field in the gaps and cause the coil and the diaphragm to move and generate sound at the audio frequencies. Likewise when used as a microphone, sound at audio frequencies acting on the diaphragm will cause it to move, and when the gap portions of the coil wire move in the magnetic field electrical signals will be generated and output on the terminals of the transducer.

BRIEF DESCRIPTION OF DRAWINGS

In the following the invention will be explained in detail with reference to the accompanying drawings, in which FIGS. 4a, 4b and 4c show views of two coils for the transducer of FIG. 1-2, FIGS. 5a, 5b and 5c show views of an alternative coil configuration based on a single twisted coil.

Figure 1:
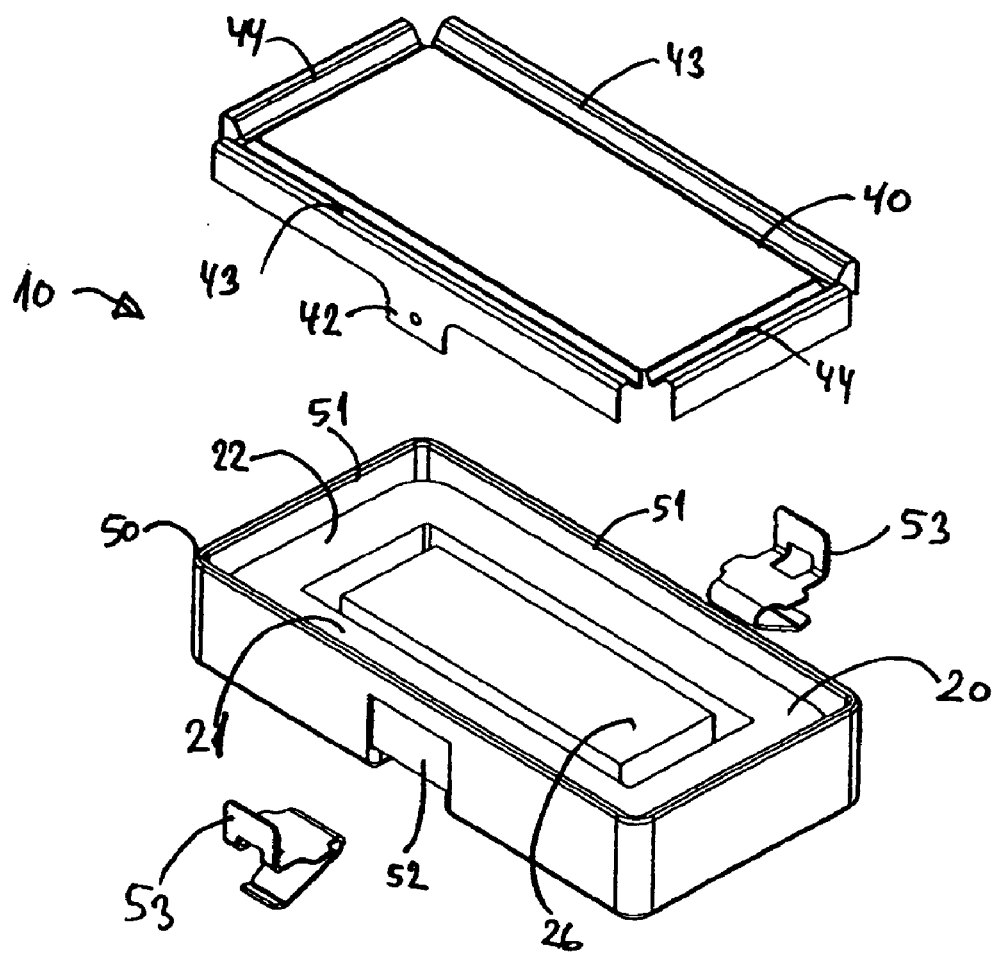
FIG. 1 is a perspective view showing a preferred embodiment of the invention with its essential parts exploded seen from above.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF INVENTION

Figure 2:
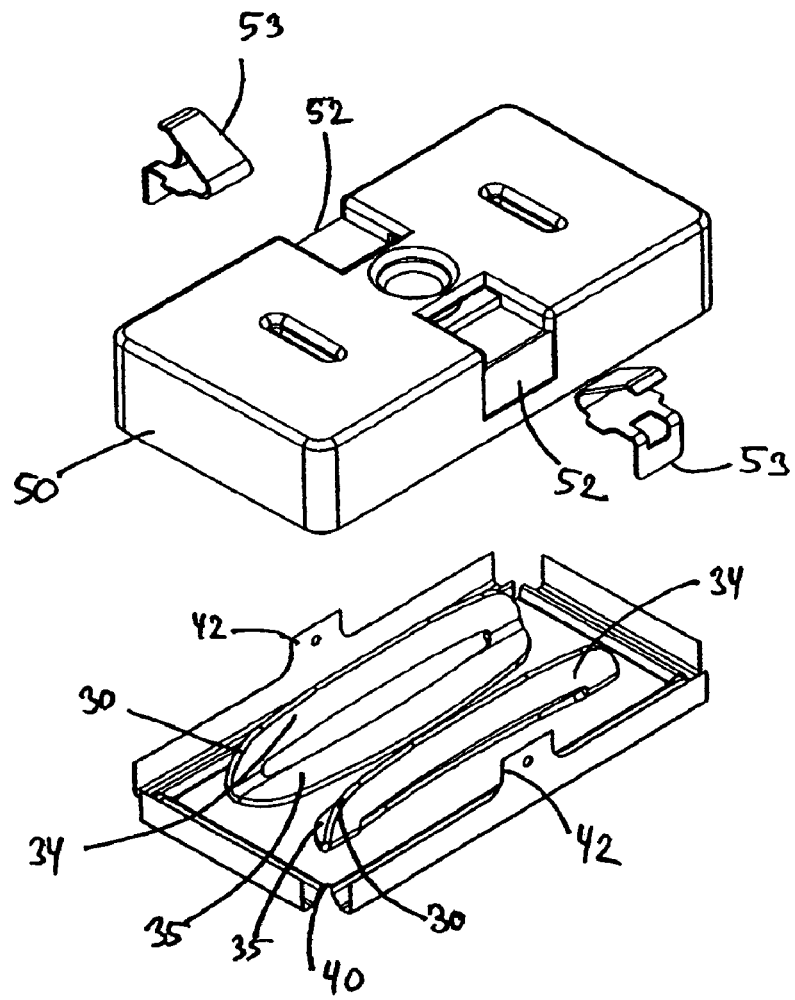
FIG. 2 shows the same parts in perspective seen from below.
Figure 3:
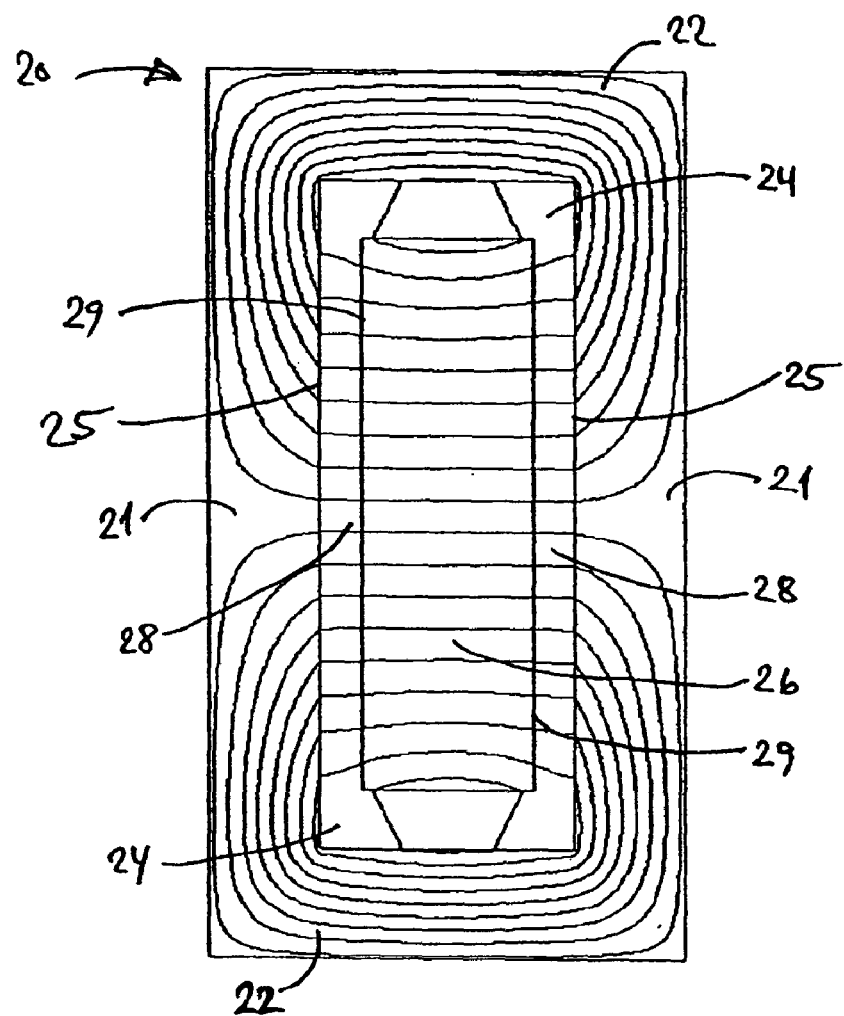
FIG. 3 shows the magnetic circuit of the transducer in FIGS. 1-2 with magnetic flux lines indicated.

FIGS. 1 and 2 show a transducer 10 according to the first aspect of the invention with its main components: a magnetic circuit 20, a coil system 30 and a diaphragm 40. FIG. 3 also shows the magnetic circuit 20.

As is best seen in FIG. 3, the magnetic circuit 20 has two long legs 21 and two short legs 22 connected at their ends to form a ring of generally rectangular shape, thus forming a rectangular through-going opening 24. The two long legs 21, the two short legs 22 are of a magnetically soft material preferably having a high magnetic saturation value. The surfaces 25 of the two long legs 21 facing towards the opening 24 are generally plane and define a gap there between. A magnet 26 is fixed in the centre of the opening in such a way that it is not in direct contact with the magnetically conductive material. The two poles of the magnet 26 are directed towards each of the long legs 21 thus defining gaps 28 between the magnetic pole surfaces 29 and the surfaces 25 of the long legs 21.

The rectangular magnet 26 creates a magnetic field in the gap 28, and the magnetic return paths are defined through the short legs 22 and the long legs 21. The magnetic return paths thus completely encircle the magnetic gaps 28 with the surfaces 29 of the magnet defining a gap 28. This gives a very flat and compact structure of the magnetic system with the magnetic field concentrated in the gaps 28 and a low stray magnetic field, which results in a high sensitivity and less need for magnetic shielding. In FIGS. 1 and 2 the magnetic system 20 in FIG. 3 is situated in an e.g. plastic casing 50, e.g. by moulding or by fitting into a pre-formed "box". The casing may have a bottom closing the openings 24 or leave them open. In the shown embodiment of the transducer 10, the coil system comprises two coils. Caused by the design of the magnetic system 20 the magnetic fields in the two gaps 28 have the same direction. Thus, the coil system should preferably be arranged so that the gap portions 34 in both gaps 28 will conduct electrical current in the same direction. In opposite case the electromagnetic forces would tend to tilt the membrane rather than tending to move in a linear motion, thus resulting in poor sensitivity and distortion. FIGS. 4a, 4b and 4c show an embodiment of the coils in the coil system 30 used in the transducer 10 of FIGS. 1 and 2. The coil system 30 comprises two similar coils each having a gap portion 34 positioned in respective ones of the gaps 28. The fastening portion 35 of the coil is used to fasten the coil to the diaphragm. In the shown embodiment the fastening portion 35 is quite large compared to the diaphragm 40, thus having a stiffening effect on the diaphragm 40 and at the same time providing a good mechanical connection between the coil and the diaphragm. Using two coils the electrical current direction in the two gaps 28 can be controlled by the electrical wiring of the coils. It is a general requirement that the electromechanical properties of the two coils are substantially identical. Differences between the two coils will tend to tilt the diaphragm, thus resulting in distortion.

Figure 12:
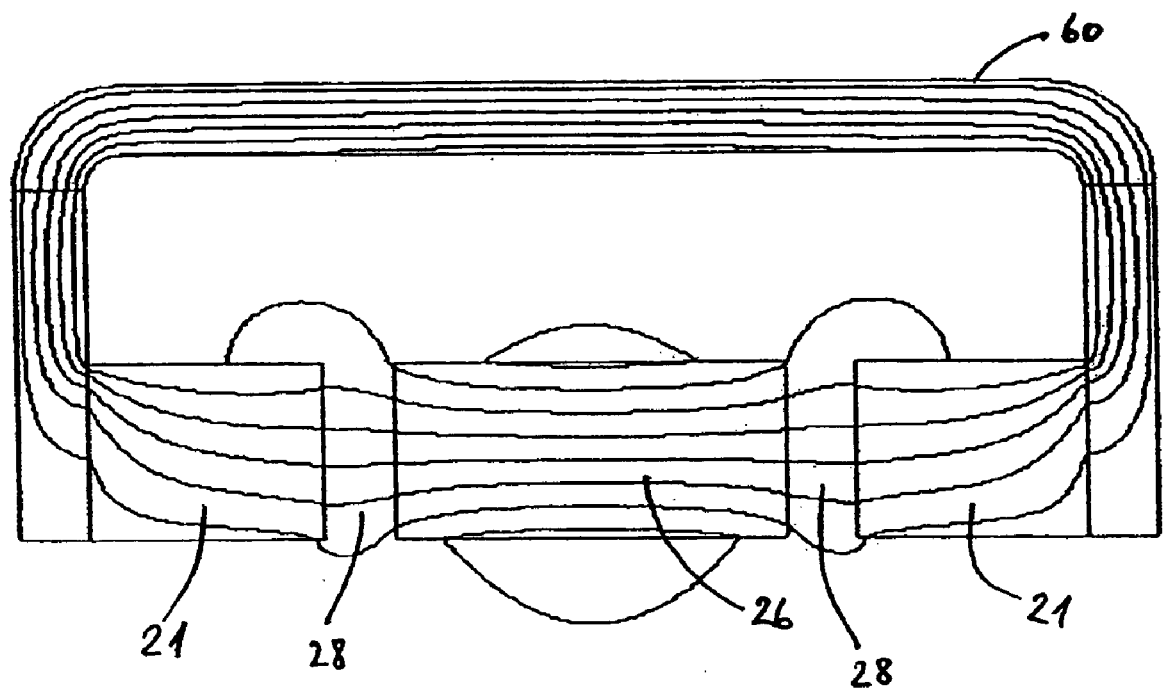
FIG. 12 shows a cross section of the embodiment with the front cover integrated into the magnetic circuit.

The transducer will preferably have a front cover 60 with openings in front of the diaphragm in order to protect the diaphragm. This front cover 60 can be made of materials such as plastic or different metals. In case the front cover 60 is manufactured using a magnetic conductive material, the front cover can serve as part of the magnetic system 20 by forming a return path for the field lines, such as sketched in FIG. 12. In this way the cross section of the legs 21,22 forming the other part of the magnetic system can be reduced, thus saving material, weight and space. Alternatively the acoustic output can be improved in terms of increased sensitivity. In an alternative embodiment the front cover 60 is also manufactured using a magnetic conductive material and is further integrated into the magnetic circuit 20 so the short legs 22 of the magnetic conductive body are omitted.

The coil 30 is wound of electrically conducting thin wire such as copper and comprises a plurality of turns electrically insulated from each other, e.g. by means of a surface layer of lacquer. The coil 30 has a coil axis perpendicular to the drawing. As is known in the art, the wire and the coil is heated during winding, whereby the lacquer becomes adhesive and adheres the windings to each other and thereby stabilises the coil mechanically. The wire of the coil 30 has two wire ends for connecting the coil electrically to e.g. electronic circuits.

The coil 30 is wound on a mandrel of generally rectangular cross section, whereby the coil is given the shape shown in FIGS. 4a, 4b and 4c with a generally rectangular opening 32 and a generally rectangular outer contour. The rounded corners and slight curvature of the sides are due to practical problems winding a pure rectangular coil. In FIG. 4 the coil is relatively flat and has a thickness, which is less than its radial width between its inner and outer contours—typically 10-30% of the radial width or according to the subsequent operations to be performed on the coil.

After the coil 30 has been wound with the desired number of turns of wire and to the desired shape and thickness it is removed from the mandrel. While the coil 30 is still warm, and the lacquer is still soft due to the elevated temperature, the coil 30 is bent along the bending axes 33 in the plane of the flat coil using a (not shown) bending instrument. The coil is hereby given the shape shown in FIG. 2 and FIG. 4a, where the gap portion 34 of the coil has been bent 90 degrees relative to the fastening portion 35. After the bending the coil is allowed to cool so that the lacquer is no longer flexible, and the coil stabilises. In another method of producing the coils the bending takes place on the mandrel.

The bent and stabilised coil is then fastened to the diaphragm 40. The diaphragm is made from a thin and flexible sheet. On its lower side, which is the side shown in FIG. 2, the diaphragm 40 has electrically conductive portions, and the two long portions 35 of the coils are fastened to the lower side of the diaphragm 40, e.g. by means of an adhesive, with the wire ends electrically connected to respective ones of the electrically conductive portions, e.g. by soldering, welding or applying conducting adhesive. The fact that the wire ends are connected directly to the diaphragm significantly reduces the risk of breaking/damaging the wires when the transducer is operated, i.e. the diaphragm 40 is moved, since the coil 30 is fastened to the diaphragm 40. However, the wire ends may alternatively be electrically connected to terminals 53 on the casing 50, e.g. by soldering, welding or applying conducting adhesive. The electrical contact between the wire ends and the terminals 53 may also be provided mechanically by forming the terminal so as to give a spring effect with a gold coating and thereby provide a force and thus a reliable electrical contact with the wire ends.

In another embodiment the coil system 30 is formed by one single twisted flat coil, such as shown in FIGS. 5a, 5b and 5c. The twisted coil has two gap portions 34 positioned in respective ones of the gaps 28. The twisting serves to give the same direction of the electrical current in the two gaps 28 obtained with one single component. The resulting cross-shaped portion 35 of the coil system where it is fastened to the diaphragm gives a stiffening effect of the diaphragm.

Figure 7:
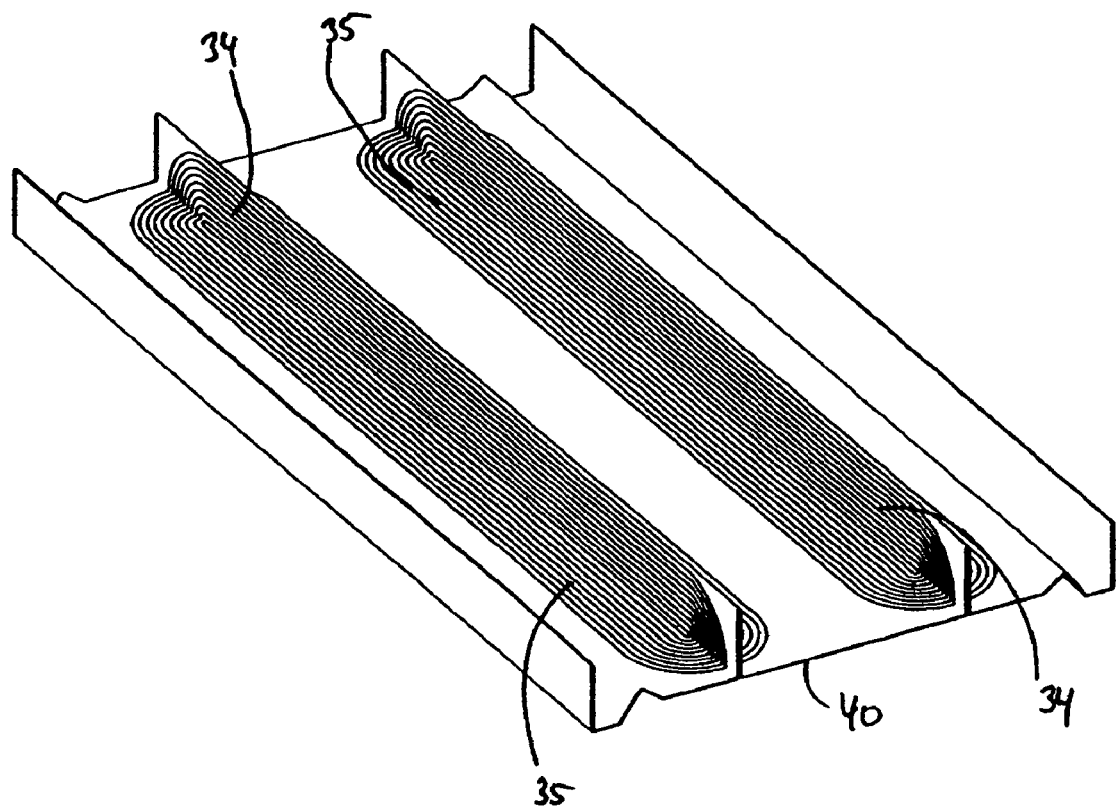
FIG. 7 shows an integrated diaphragm and coil system implemented using a flexprint.
Figure 8:
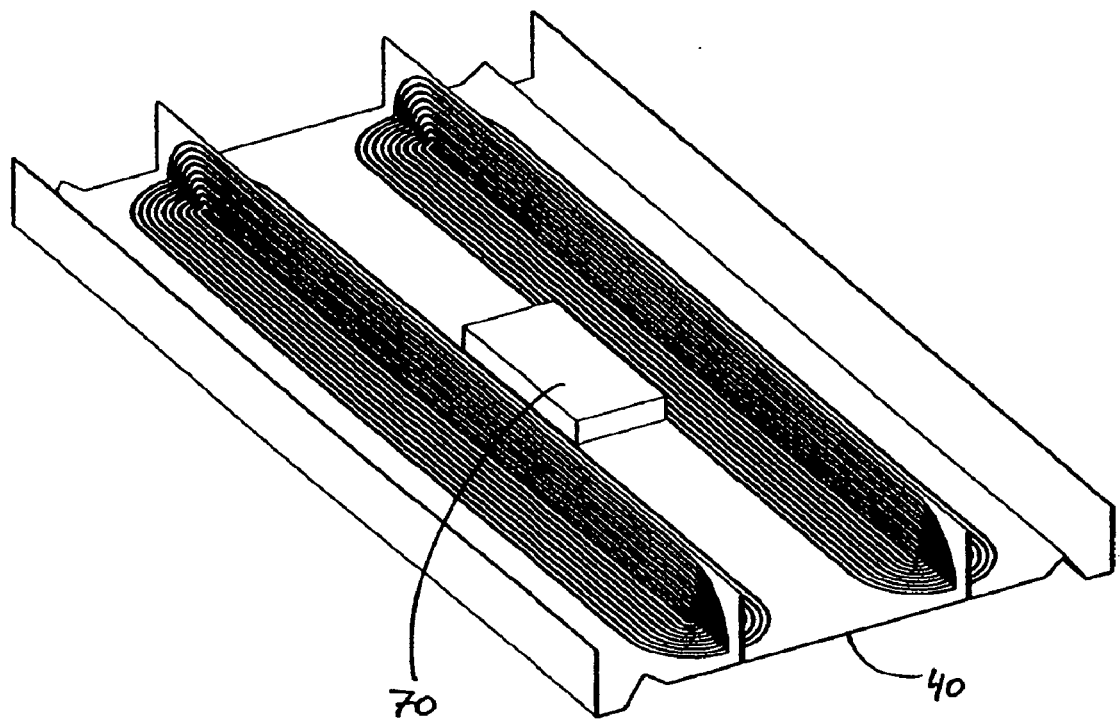
FIG. 8 shows a version of the diaphragm and coil system of FIG. 7 mounted with an electronic chip.

In yet another alternative embodiment of the coil system 30, a coil 30 may be formed by a thin and flexible sheet, such as a flexible printed circuit board, i.e. a flexprint. Such thin and flexible sheet will carry a predefined electrically conductive path thereon so as to form a coil-like electrical path. As explained later, the diaphragm 40 will also in its preferred embodiment have electrically conductive portions. Therefore, the coil 30 and diaphragm 40 can be made from a single sheet of flexprint with appropriate conductive paths, and this sheet will be shaped in such a way that the two long sections of the coil 30 will emerge and have an angle of 90 degrees with respect to the rest of the integrated diaphragm 40/coil 30 structure. FIG. 7 shows such an integrated diaphragm 40 and coil. The flexprint can either be single or double sided. The coil structure can either be formed using etching technique or it can be formed using laser technique. In order to increase the filling portion of coil material in the magnetic gap 28, the coil paths can be made quite wide. This will increase the sensitivity of the transducer 10 traded for a low impedance of the transducer 10. In case the impedance is too low to operate with traditional electronic amplifier equipment used for instance within mobile phones, an impedance converter contained in a chip 70 can be mounted on the diaphragm 40. An embodiment with the chip 70 mounted on the coil side of the diaphragm 40 is shown in FIG. 8.

An advantage using two or more coils is the possibility of either electrically connecting the coils in series or parallel. In this way it is possible to obtain different resulting impedances of the transducer such as connecting two 16 Ω coils thus obtaining a resulting impedance of either 32 Ω or 8 Ω. In this way the transducer can be adapted to the amplifier to be used in order to obtain the best match with respect to acoustic output and energy consumption, in case the transducer is used as loudspeaker. Connecting the coils in series or parallel can also be used for control of the acoustic output in case the transducer is used as a loudspeaker. For example the voltage sensitivity of the transducer can be adjusted 6 dB in case of different connection of two coils. The connection of the coils can be determined in the wiring or it can be switchable in a mechanical switch or in an electronically controlled switch. An electronic chip 70 comprising this switch function can for instance be positioned on the diaphragm 40, such as shown in FIG. 8.

The preferred diaphragm 40 shape is rectangular in shape, however other shapes can be used. Tongues 42 extend from the long sides of the diaphragm with the electrically conductive portions extending to the tongues, so that the electrically conductive portions on the tongues are electrically connected to respective ones of the coil 30 wire ends.

The diaphragm 40 with the coil system 30 thus fastened thereto is then mounted on the magnetic system 20 with the two long sections 34 of the coil in respective ones of the gaps 28. The diaphragm 40 has a width corresponding to the distance between the inner sides of the edges 51 of the casing 50. If desired, the long edges 43 of the diaphragm 40 may be fastened to the magnetic system 20 or to the casing 50 by means of an adhesive. The short sides 44 of the diaphragm 40 are preferably free, whereby a narrow slot is provided giving access of air between the two sides of the diaphragm 40. The slot can be tuned to have desired acoustic properties influencing the acoustic performance of the transducer, in particular at low frequencies.

If desired, the short edges 44 of the diaphragm 40 can also be fastened to the magnetic system 20 or to the casing 50, or, alternatively, the slot can be closed with a flexible substance so as to allow the short edges 44 to move. However, the flexible substance prevents air from going from one side of the diaphragm 40 to the other.

The acoustic output from the transducer depends on the chosen edge configuration. The best sensitivity is obtained with air tight edges, however the low frequency output may benefit from a tuned gap. In addition, it may be advantageous to omit the short edges 44, for example in a configuration where several similar transducers are used to form a line element.

Figure 6:
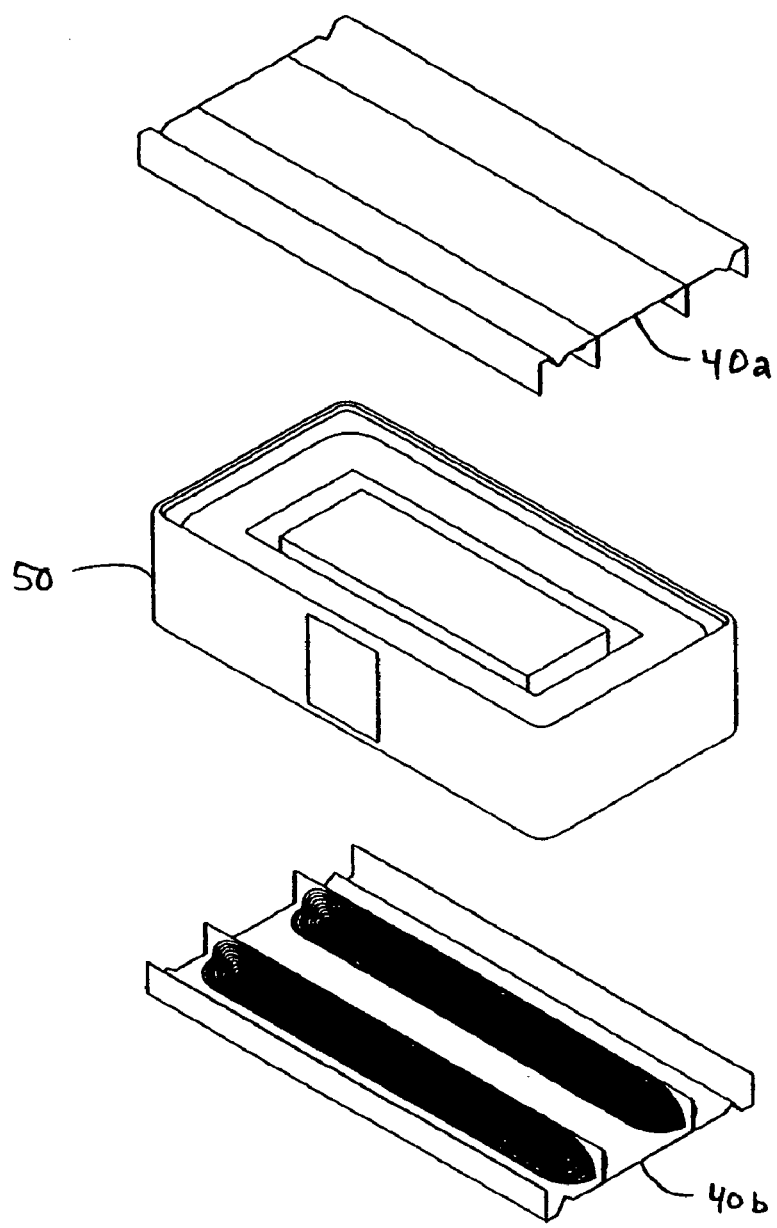
FIG. 6 shows an embodiment of the invention with two diaphragms with its essential parts exploded.

In an alternative embodiment, the transducer is supplied with two diaphragms 40a,40b and two coil systems, one coil system for the respective ones of the diaphragms. A preferred embodiment is shown in FIG. 6. The two diaphragm-coil systems are mounted on either side of the common magnetic system 20. The gap portions 34 of the coil systems for each of the diaphragms 40a,40b can be positioned so that they overlap. Alternatively, the gap portions 34 can be fitted in the gap 28 so that they do not overlap. In this case, the gap portions 34 of the opposite coils should not collide, since this would result in a distorted signal.

FIG. 6 shows an embodiment of the double diaphragm transducer with both upper and lower diaphragms formed by flexprints, such as described above. In general, the same principles with respect to the magnetic circuit, diaphragm, coil system, and casing, such as described above for the one diaphragm version of the transducer, can be applied to the double diaphragm version as well.

The double diaphragm transducer can generally be operated in two modes—the two diaphragm-coil systems being electrically coupled in phase (the diaphragms move in opposite directions) or out of phase (the diaphragms move in the same direction). The transducer can be used as an efficient loudspeaker with spherical directivity pattern when coupled in phase. When coupled out of phase the transducer is a substantially silent vibration source. Correspondingly, when used as microphone, the transducer can either have a spherical or a lemniscatical (figure-of-eight) directivity pattern.

For applications such as mobile communication equipment the double diaphragm transducer is suitable since it can serve as loudspeaker by normal operation mode as well as vibration source for providing a silent alarm signal. Thus, serving two functions the double source transducer saves space, weight and reduces the total number of single components.

For special applications it may be interesting that the directivity pattern of the double diaphragm transducer can be controlled in more detail by applying appropriate signal processing. However, the frequency range where this is possible depends, among other features, on the size of the diaphragm.

In order to provide space for accommodating the fastening portions 35 of the coil system, the height of the magnet 26 can be made slightly smaller than the height of the magnetic conductive material. However, other arrangements for generating the necessary space for these portions 35 of the coil system are available, such as providing indentations (typically two) in the magnet 26.

In FIGS. 1 and 2 the magnetic circuit 20 is made as one solid block. It can also be made of several laminated layers.

FIGS. 1 and 2 also show that, on its sides, the casing 50 has two grooves or channels 52 ending on the bottom of the casing 50. The channels 52 have a width corresponding to the width of the tongues 42. The tongues 42 will be bent and received in respective ones of the channels 52 with the ends of the tongues received in the part of the grooves at the bottom of the casing 50. The ends of the tongues will be bent 180 degrees so that the end of the conductive portion becomes exposed, or a through-plated hole will establish electrical connection through the tongue. The end portions of the conductive portions of the tongues will thus act as the electrical terminals of the transducer. For some applications, such as mobile phones, it may be interesting to connect the transducer to the electronic equipment by directly soldering the conductive portions of the tongues 42 to conductive portions of a circuit board. Alternative to soldering, a conductive adhesive could be used. Alternatively, the end portions of the conductive portions 42 of the tongues can be soldered or by other means connected to electrical terminals 53 mounted in the grooves 52 of the casing 50.

Figure 11:
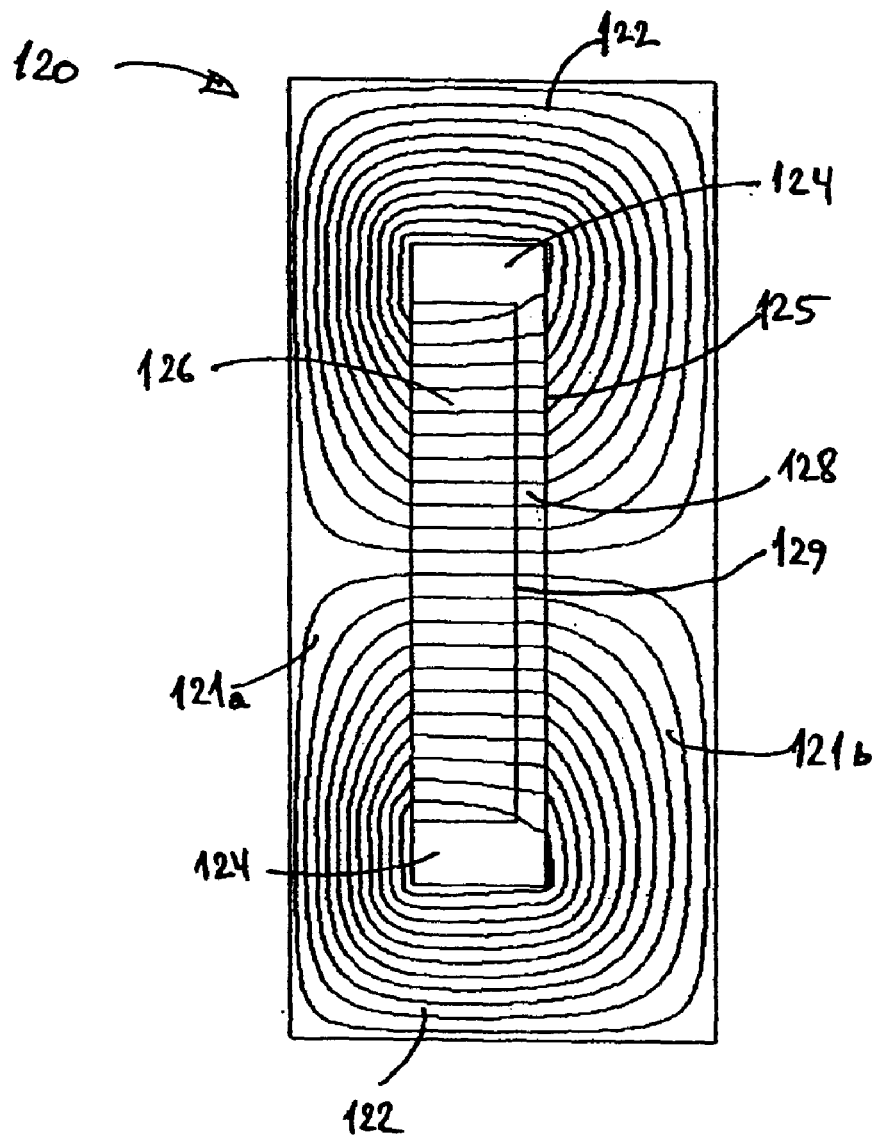
FIG. 11 shows the magnetic circuit of the embodiment with one gap with magnetic flux lines indicated.

An embodiment of the magnetic circuit 120 according to the second aspect of the invention is sketched in FIG. 11 with the magnetic flux lines indicated. In contrast to embodiments according to the first aspect, the magnet 126 is arranged so that one of its magnetic poles 129 defines a surface of only one magnetic gap. The magnetically conducting body 121a,121b,122 of the one gap embodiment of the transducer is preferably asymmetrical so that the leg 121a with the magnet 126 mounted is thicker than the opposite leg 121b, such as sketched in FIG. 11. As described in connection with the above-mentioned embodiments according to the first aspect of the invention, a front cover for protecting the diaphragm can be used to form part of the magnetic return path. In a preferred embodiment the opening 124 in the magnetic body is through-going.

Figure 9A:
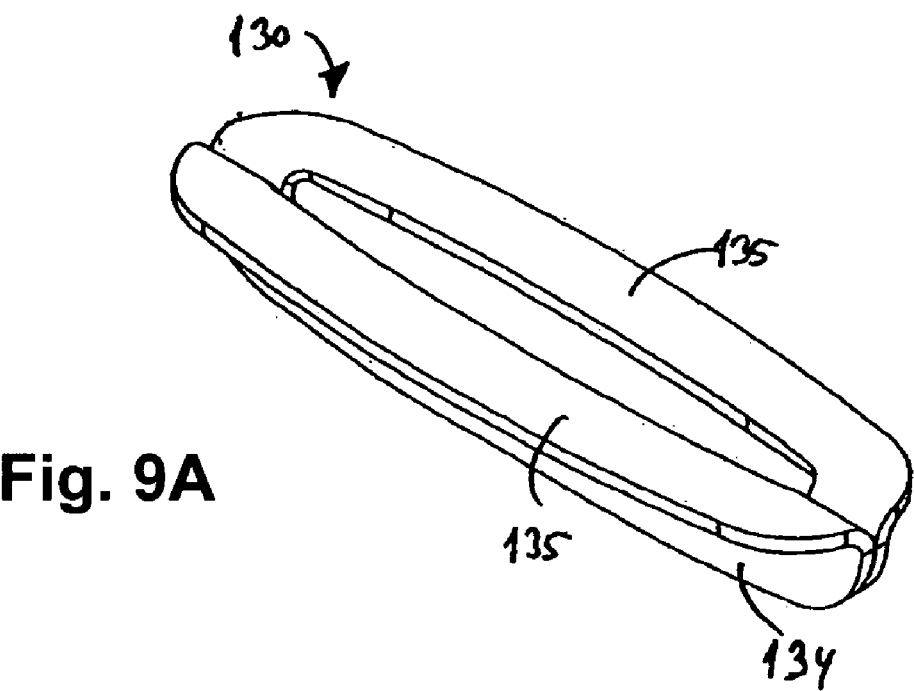
FIGS. 9a and 9b show views of a T-shaped double coil for the one gap embodiment of the invention.
Figure 9B:
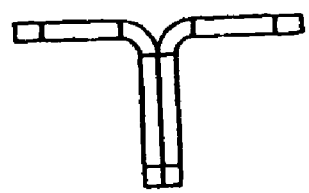
Figure 10:
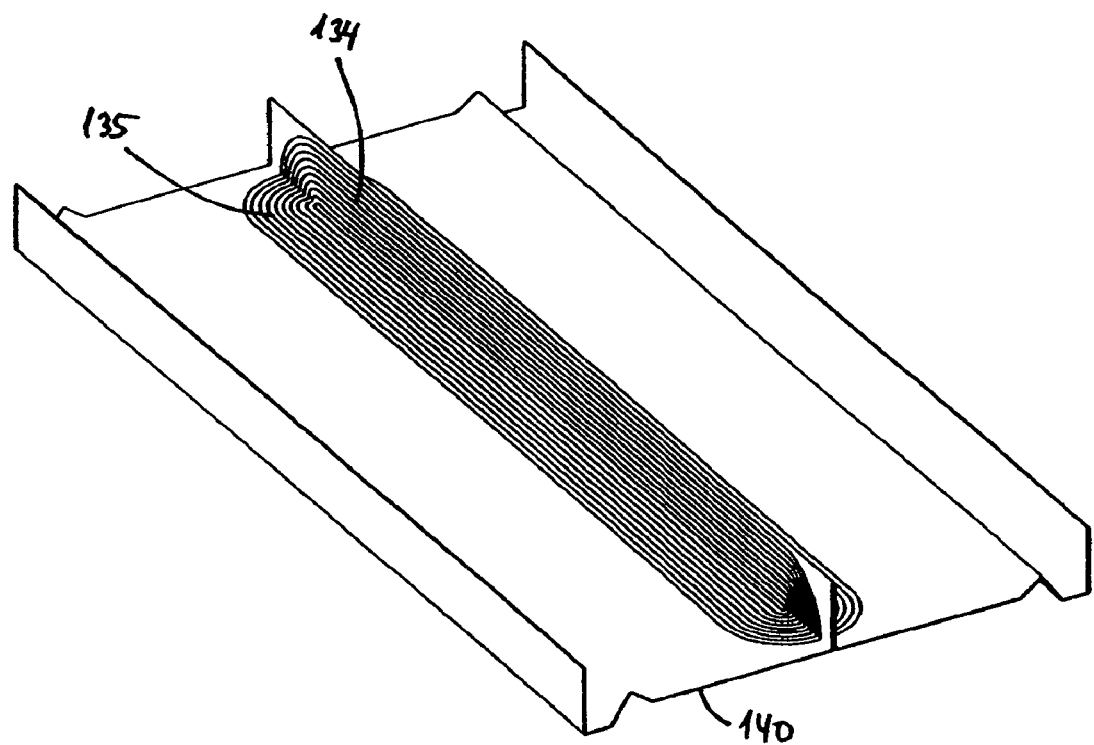
FIG. 10 shows an alternative diaphragm and coil system for the one gap embodiment using a flexprint.

The one gap embodiment can operate with only one coil which can be formed as one of the perpendicularly bent coils as described above and shown FIGS. 4a, 4b and 4c. However, in order to make the moving system symmetrical and in addition ensure a better mechanical coupling to the diaphragm, two such coils can be glued together thus having a T-shaped cross section, such as shown FIGS. 9a and 9b. However, in another embodiment a circuit board, such as a flexprint, is used for diaphragm 140 and coil system where the wires of the coil 134,135 is a pattern on the flexprint such as sketched in FIG. 10 and more thoroughly described in connection with the first aspect of the invention. The flexprint can be formed so as to comprise one or more separate coils. In case of more than one coil, it is possible to electrically connect the coils either in series or parallel, or combinations hereof in case of more than two coils, such as described in the first aspect of the invention.

In general, most other details described in connection with the first aspect of the invention are applicable in the one gap transducer as well. This is also the case with respect to an embodiment of the one gap transducer with two diaphragms.

Figure 13A:
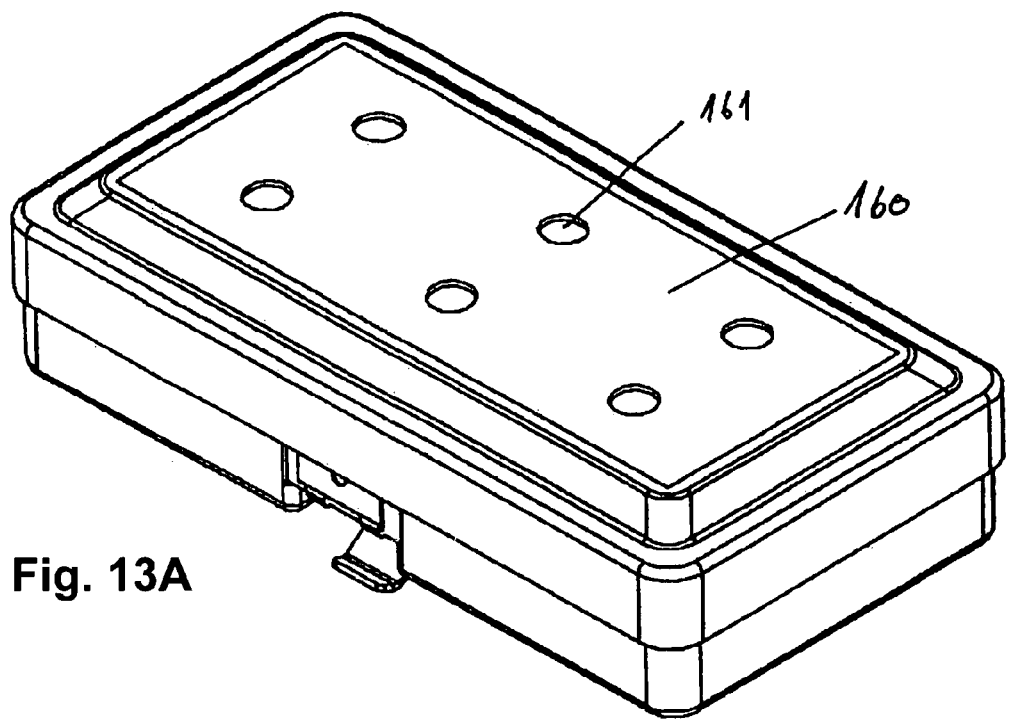
FIGS. 13a and 13b show two one-diaphragm embodiments with different front covers.
Figure 13B:
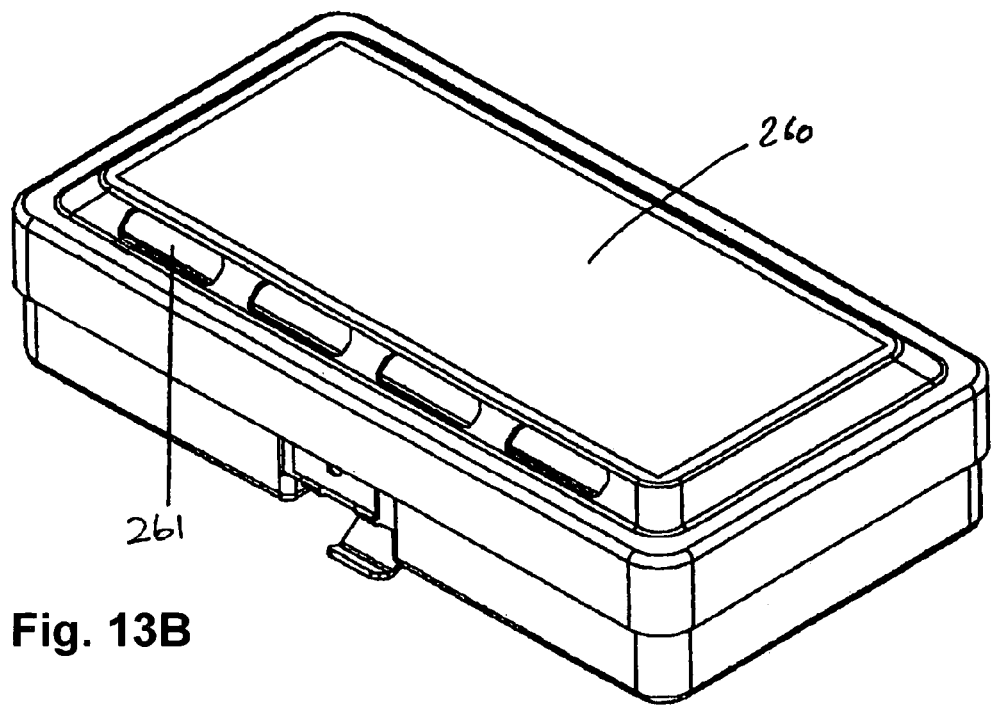

FIGS. 13a and 13b show two one-diaphragm embodiments with different front covers. FIG. 13a shows an embodiment with a front cover 160 with six circular sound inlet/outlet openings 161 positioned in a flat front part of the front cover 160. When used as a loudspeaker this embodiment will particularly radiate sound in a direction perpendicular to a plane formed by the front cover 160, i.e. in a front direction.

FIG. 13b shows an embodiment with a front cover 260 having four sound inlet/outlet openings 261 positioned in a side part of the front cover 260, whereas a flat part forming a front part of the front cover 260 is closed. When used as a loudspeaker this embodiment will particularly radiate sound in a direction parallel to a plane formed by the front cover 260, i.e. in a side direction. This may be particularly interesting in relation to mobile communication devices such as mobile phones with the so-called side-shooting or side-firing principle. According to this principle a sound outlet is positioned on a side part of the mobile phone for use in a hands free mode. Using side-shooting instead of a normal front speaker in the hands free mode a user is protected from hearing damages due to large sound pressures if accidentally the user puts the mobile phone close to his/her ear.

Figure 14:
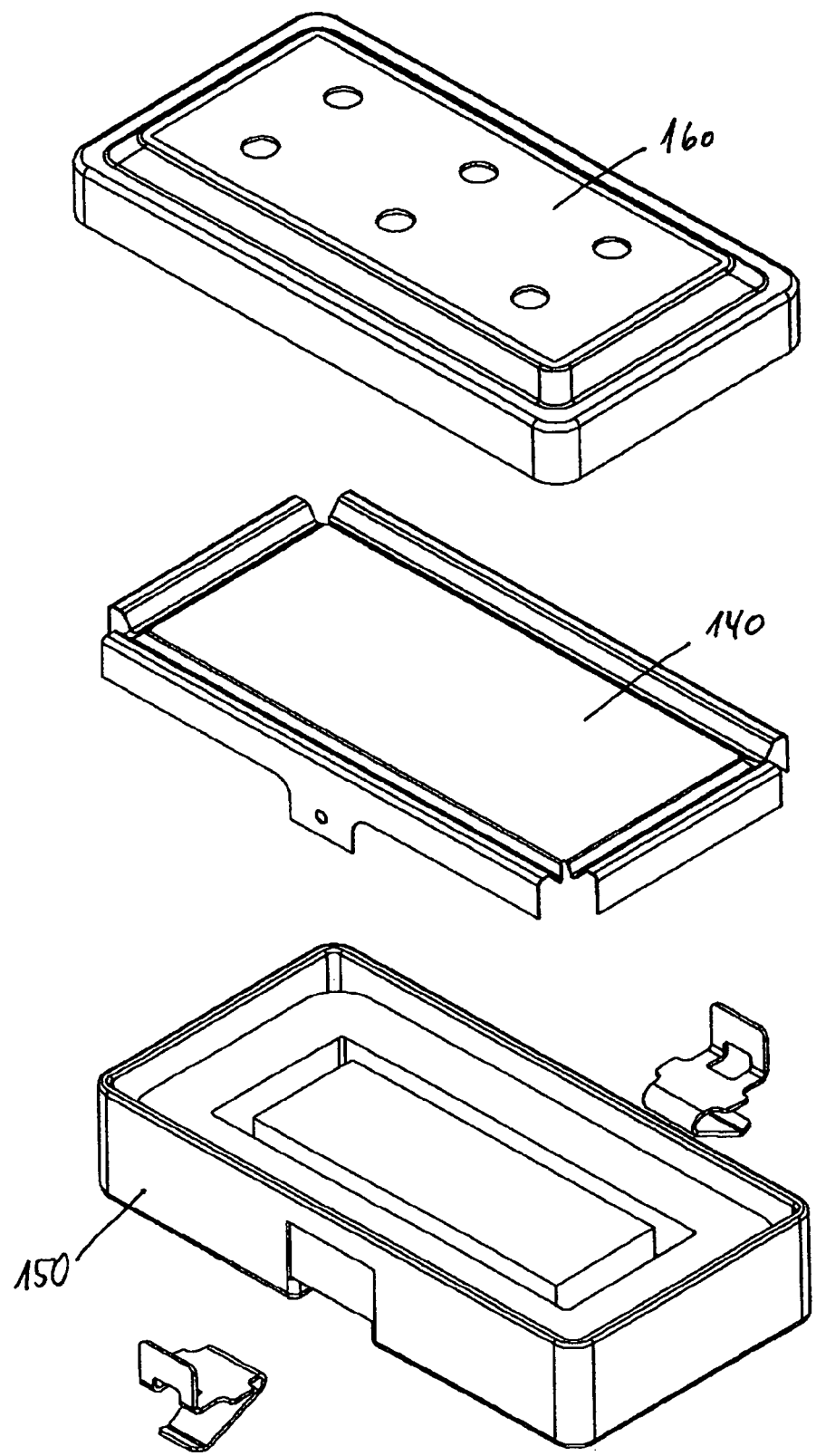
FIG. 14 shows an exploded view of an embodiment of FIG. 13a, and FIG. 15 shows an exploded view of an embodiment of FIG. 13b.

FIG. 14 shows an exploded view of the embodiment of FIG. 13a. The front cover 160 is mounted in front of a flexprint type diaphragm 140, and a magnetic circuit is positioned within a casing 150. The front cover has an edge part adapted to fit substantially airtight to sides of the casing 150. Side parts and bottom parts of the casing 150 form together with the front cover 160 a substantially airtight enclosure of which the only acoustic opening is formed by the openings 161 in the front of the front cover 160.

Alternatively, it may also be preferred to have an additional opening so as to establish acoustical access to an inner air volume of a device in which the transducer is installed. Hereby an increased effective back volume behind the diaphragm 140 is provided. The additional opening may be formed by an opening in a bottom part of the casing 150, and the casing 150 may for example be formed without a bottom part. In FIG. 2 small openings are arranged in connection with recesses 52 in the casing 50 that serve for attachment of electrical terminals 53.

An airtight enclosure behind the diaphragm 140 may be preferred, for example, in order to provide a loudspeaker for a mobile phone which does not put any acoustical restriction to the mobile phone manufacturer with respect to acoustical properties of an inner volume of the mobile phone. However, in order to provide a loudspeaker unit with acoustical satisfactory performance a certain size of effective back volume is required. Therefore, a loudspeaker unit with an airtight back volume will normally be larger than a similar version with an open backside.

Figure 15:
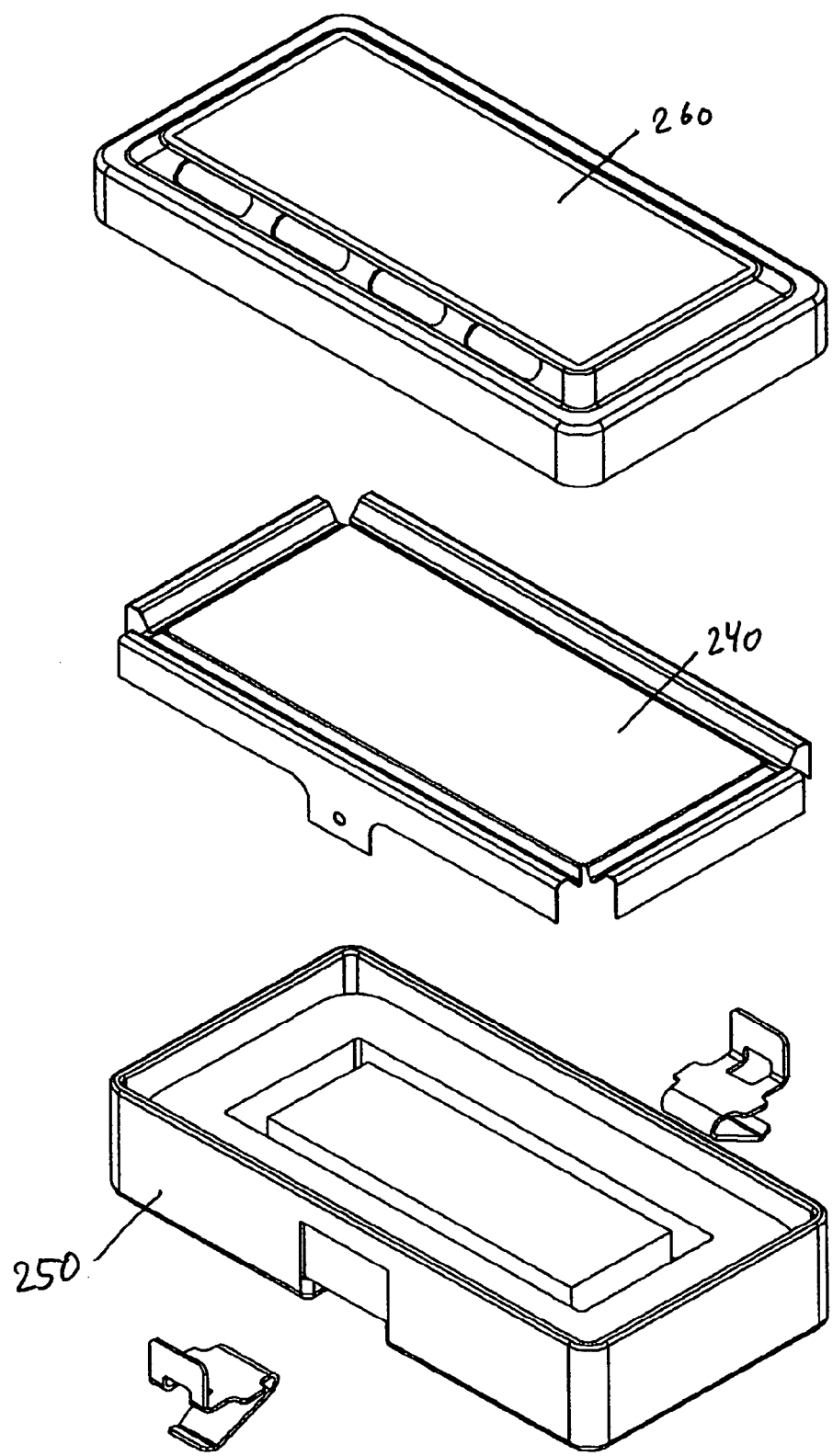

FIG. 15 shows an exploded view of the embodiment of FIG. 13b. The front cover 260 is mounted in front of a flexprint type diaphragm 240, and a magnetic circuit is positioned with a casing 260.

Similar to the description in relation to the embodiment of FIG. 14, the front cover may have edge parts adapted to fit substantially airtight to sides of the casing 250 such that side parts and bottom parts of the casing 250 form together with the front cover 260 a substantially airtight enclosure behind the diaphragm 240. Thus the only acoustic opening of the transducer is formed by the openings 261 in the side of the front cover 260. Alternatively, openings in a back part of the transducer may be preferred as described above.

All the embodiments of the transducer according to the invention may be used as a microphone or as a loudspeaker transducer. The different embodiments of the invention described all have the potential of being manufactured with very compact dimensions. All transducers according to the present invention can be produced with a very small height. This is especially the case if produced with a through-going opening in the magnetic body. The transducers can also be produced very slim—especially the one gap version is suited for this purpose. A width of 4 mm or even smaller is possible. The compact dimensions opens up for a number of new applications such as using the transducer as a loudspeaker in positions with very limited amount of space, such as mobile communication equipment and hearing aids.

An example of a new application made possible with the very compact dimensions is within mobile phones, where it is possible to mount a transducer on each side of the display of the phone without increasing the overall dimensions of the phone. In this way it is possible to play stereo soundtracks over the phone. This can be used to accompany the movie or video clip shown on the display. Electronic manipulation, such as phase manipulation, can be used to enhance the stereo effect in spite of the quite small distance between the two loudspeakers. Other possible applications for long and narrow loudspeaker elements are such as on the sides of computer displays, for instance laptop or palm computers.

In case several transducers are stacked to form one long and slim loudspeaker elements a number of advantages can be obtained. An acoustic effect of a long but narrow loudspeaker is that it is highly directional perpendicular to its main axis. This has a number of advantages for several applications. For instance when used on the sides of computer displays the loudspeakers can be directed towards the listener and therefore disturbance of the surroundings can be minimised—an important effect in open-plan offices. In general, highly directive loudspeakers are advantageous for applications where the sound reproduction is intended to be independent on the acoustical surroundings, i.e. the presence of reflections. An example of this is for 3D-sound reproduction in form of binaural signals (such artificial head recordings or purely synthesised signals). These signals are best suited for headphone reproduction. However, highly directive loudspeakers are advantageous when the 3D-sound reproduction technique is intended to function properly with loudspeakers and electronic compensation (cross-talk cancellation) replacing headphones. 3D-sound reproduction in connection with a computer display with small directive loudspeakers Very long and slim loudspeaker elements may also be used as hi-fi loudspeakers when supplemented with a sub-woofer to cover the low frequency region. Long and slim loudspeaker elements can easily be fitted into a living room without occupying space—for example in corners of the room, or by replacing wood mouldings between floor and walls. The slim elements can also be mounted on the walls—even with the opportunity of obtaining decorative effects.

Yet another example of applications for small highly directive loudspeakers is equipment for visually impaired persons. Here, the directive loudspeakers can be used to guide the person using sound which can only be heard in specific positions. An example of such equipment is the well-known "audible traffic lights" for pedestrians, where it can be difficult to distinguish to which of the two cross roads a certain sound indication is valid. A highly directive sound source may help to facilitate the distinction between two cross roads, since it can be arranged so that only the relevant sound signaller can be heard when the person is in position, ready for crossing a road.

What is claimed is:
1. An electroacoustic transducer comprising
 a magnetic circuit having a first and a second gap, and
  magnetic means establishing a magnetic field in each of the first and second gaps, the magnetic fields having the same direction, a diaphragm, and a coil system comprising at least one coil forming an electrically conducting path, the coil system having portions of the electrically conducting path fastened to the diaphragm, the coil system further having first and second gap portions of its electrically conducting path situated in respective ones of the first and second gaps, wherein the magnetic means comprises a magnet arranged so that each of its magnetic poles defines a surface of respective ones of the first and second gaps.

2. The transducer according to claim 1, wherein the first and second gap portions of the coil system are adapted to conduct electrical current in substantially the same direction.

3. The transducer according to claim 1, wherein a flexible circuit board, forms the diaphragm, and wherein the coil system is formed by gelectrically conducting paths on the flexible circuit board.

4. The transducer according to claim 3, further comprising electronic means mounted on the flexible circuit board.

5. The transducer according to claim 1, wherein the magnetic circuit comprises a body of magnetically conductive material, the body having a through-going opening, the opening having a pair of opposed surfaces, each of the opposed surfaces defining a surface of respective ones of the first and second gaps.

6. The transducer according to claim 5, wherein the magnet is positioned symmetrically in the opening of the body of magnetically conductive material.

7. The transducer according to claim 1, wherein the diaphragm has electrically conductive portions, and wherein the coil system has electrically conducting path ends electrically connected to the electrically conductive portions of the diaphragm, the electrically conductive portions further having externally accessible portions for electrically terminating the transducer.

8. The transducer according to claim 1, further comprising a casing for housing the magnetic circuit, the casing comprising a rectangular-shaped opening being defined by two pairs of edges, the diaphragm being attached to the casing in a manner so as to at least partly cover the rectangular-shaped opening.

9. The transducer according to claim 8, wherein the diaphragm has a rectangular shape so as to cover the rectangular-shaped opening of the casing.

10. The transducer according to claim 1, wherein each of the first and second gaps has upper and lower portions, and wherein the gap portions of the coil system are positioned in the upper portions of the gaps, the transducer further comprising a lower diaphragm, and a lower coil system comprising at least one coil forming an electrically conducting path, the lower coil system having portions of the electrically conducting path fastened to the lower diaphragm, the lower coil system further having first and second gap portions of its electrically conducting path situated in respective ones of the lower portions of the first and second gaps.

* * * * *